United States Patent [19]
Shaw

[11] Patent Number: 5,596,938
[45] Date of Patent: Jan. 28, 1997

[54] APPARATUS FOR UNLOADING SEEDLINGS FROM A TRAY AND TRANSPORTING THEM ELSEWHERE

[76] Inventor: Lawrance N. Shaw, 8715 NW. 4th Pl., Gainesville, Fla. 32607-1412

[21] Appl. No.: 487,893

[22] Filed: Jun. 7, 1995

[51] Int. Cl.[6] .................................................. A01C 11/02
[52] U.S. Cl. ............................ 111/105; 111/100; 111/174
[58] Field of Search .................................. 111/104, 105, 111/100, 101, 102, 103, 906, 915, 918; 47/1 A, 901, 101; 414/417

[56] References Cited

U.S. PATENT DOCUMENTS

| | | | |
|---|---|---|---|
| 3,387,745 | 6/1968 | Thibodeaux et al. | 111/104 |
| 4,294,179 | 10/1981 | Cayton et al. | 111/105 |
| 4,388,035 | 6/1983 | Cayton et al. | 111/104 |
| 4,788,920 | 12/1988 | Shaw | 111/2 |
| 5,121,701 | 6/1992 | Reed et al. | 111/105 |

FOREIGN PATENT DOCUMENTS

| | | | |
|---|---|---|---|
| 2569330 | 2/1986 | France | 111/105 |
| 6113624 | 4/1994 | Japan | 111/105 |
| 627358 | 8/1949 | United Kingdom | 111/105 |
| 2166634 | 5/1986 | United Kingdom | 111/105 |
| 95/04451 | 2/1995 | WIPO | 111/105 |

*Primary Examiner*—Dave W. Arola
*Assistant Examiner*—Robert Pezzuto
*Attorney, Agent, or Firm*—Arthur G. Yeager

[57] ABSTRACT

An apparatus for unloading a tray full of seedlings and transporting them one at a time to another location for further handling, e.g., for planting. The apparatus is arranged to be towed behind a prime mover, and all operations are powered by the movement of the apparatus on wheels and/or by compressed air generated on the prime mover.

15 Claims, 7 Drawing Sheets

5,596,938

APPARATUS FOR UNLOADING SEEDLINGS FROM A TRAY AND TRANSPORTING THEM ELSEWHERE

TECHNICAL FIELD OF THE INVENTION

This invention relates to the technical field of agriculture or nursery machinery.

BACKGROUND OF THE INVENTION

The nursery business of growing plants from seeds and nurturing the plants until they are large enough for sale is rapidly increasing in urban areas where homeowners are interested in decorating their homes and lawns with growing plants, including herbs, grasses, shrubbery, trees, vegetables, and a variety of ornamental individual plants. The business requires someone to begin the process by planting seeds, cuttings, or the like in small containers, perhaps transferring the small seedlings to intermediate sized pots, and eventually sell the potted plant or cut it to be sold as individual flowers, branches, or the like. The usual place of beginning is in a cell of a tray containing 50–100 or more cells arranged in checkerboard fashion of vertical columns and horizontal rows, perhaps of a lightweight rupturable material that may be biodegradable such that the seedling and its cell may be planted. In other optional systems the tray is intended to be reusable, and this requires a step of removing the plug of earth and its seedling from the growth cell in the tray. It is at this step that the present invention finds its utility.

Removal of seedlings from a reusable tray has for many years been chiefly a task for humans. However, some inventors have devised machinery to do this job. The principle problem has been to remove the seedling and a plug of earth in a unit that is strong enough to be handled without losing the earth plug and without damage to the roots and the vegetation. These problems have led to the design of cells that taper from narrow at the bottom to wider at the top of the earth plug, thus making it easier to remove a solid plug. Furthermore, cells are now made with large holes in the center of the bottom wall so as to permit a plunger to enter the hole from outside the bottom and to push the plug of earth and the seedling upwardly out of the cell. Both of these design features are now standard state-of-the-art, and are expected to be used with the apparatus of this invention. There is room for much improvement over the early machines for removing seedlings from trays, and it is believed that this invention will advance the art considerably.

It is an object of the invention to provide an improved seedling handling machine. It is another object of this invention to provide an apparatus for continuously removing seedlings from growth trays and transport the seedlings individually to another location for further handling, e.g., for planting in the ground by using the apparatus described and claimed in my U.S. Pat. No. 4,788,029. Still other objects will become apparent from the more detailed description which follows.

BRIEF DESCRIPTION OF THE INVENTION

This invention relates to an apparatus for receiving at an entrance station successive trays of nursery seedlings growing in individual cells each having an ejector hole in the bottom thereof the cells being arranged in rows in a checkerboard pattern; ejecting the seedlings from their cells individually into moving compartments and transporting them to an exit station for discharge one at a time; said entrance station including a vertical chute for holding said trays positioned on edge vertically with the stalks of said seedlings generally horizontal, and including means for moving each tray vertically downward at selected times to position each successive horizontal row of said cells at a selected location for ejection of seedlings therefrom; said apparatus including a plurality of ejection fingers arranged in a horizontal row and adapted to be extended one at a time to protrude into said ejection hole of each cell successively in a row of said tray to eject the seedling from said cell and subsequently to be withdrawn from said cell; said apparatus including a succession of moving compartments each of a size to receive a single seedling as it is ejected from said tray and to retain that seedling lying on its side as it is transported horizontally to said exit station to be discharged therefrom; said apparatus including pneumatic means to power said ejection fingers in their movement of extension and withdrawal; and to time the movement of the tray past the ejection fingers and power means to operate all other moving components of said apparatus.

In one preferred embodiment of the invention the apparatus is mounted on ground-engaging wheels, and all movements of the components of the apparatus are powered by the turning of the ground-engaging wheels except for the extension fingers and a few small items powered by compressed air that can be generated on the vehicle towing the apparatus. In another preferred embodiment the apparatus includes a moving separator to prevent entanglement of the vegetation of a seedling being removed from the tray with vegetation of a seedling remaining in the tray. In still another preferred embodiment trays are moved past a row of fixed extension fingers that successively eject one seedling at a time from a tray, the extension fingers being extended by air pressure. In yet another embodiment the tray is moved one horizontal row at a time by operation of a ratchet system provided by compressed air. Many other individual features of the system will be described more fully below.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The invention is best understood by reference to the accompanying drawings and the following text wherein reference numbers refer to numbers on the drawings.

Figure 1:
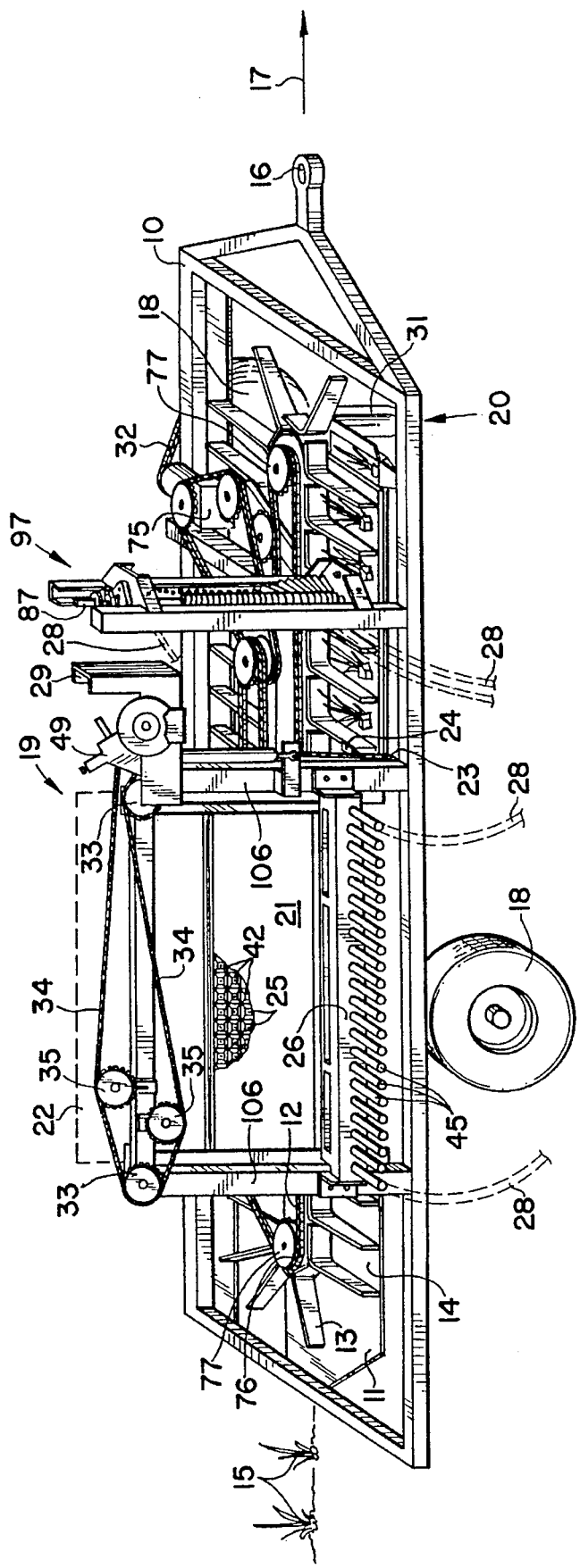
FIG. 1 is an overall perspective view of the apparatus of this invention employed to remove seedlings from a tray of seedlings and plant those seedlings in the ground.

FIG. 1 shows an overall assembly of the apparatus of this invention mounted on a frame 10 for being towed behind a prime mover, e.g., a tractor, connected to towing eye 16 and moving in the direction of arrow 17. The frame base 10 is mounted on wheels 18, usually two or four in number. Trays 21 and 22 are fed into the apparatus at an entrance station 19 and seedlings removed from such trays are discharged at an exit station. In this illustration the exit station 20 is forward of the entrance station 19, and in this instance is shown to be a seedling planting device 31, which plants the seedlings in the ground being passed over, leaving a row of spaced planted seedlings 15 behind the apparatus. It is to be understood that the entrance station 19 and the exit station 20 may be at other locations for other systems. For example, it may be desired to remove seedlings from trays and plant them in individual pots, in which event the exit station might be at another location where pots could be readily available for hand planting or mechanical planting.

The trays 21 and 22 intended to be used in this invention may be any size and shape within certain limitations. Generally such trays that are commonly used today are from about 18–36 inches long, 12–18 inches wide, and about 1.5–3.0 inches deep, generally made of plastic and arranged in a checkerboard pattern of columns and rows with perhaps 100–300 individual cells 42 for seeds to grow into seedlings. Each cell may have a plug of earth about 1–2 inches deep, and the seedlings may grow to have vegetation extending 3–6 inches above the earth plug. Usually the cells are tapered inwardly to a narrow bottom where there is a hole of about 0.375 inch in diameter to provide drainage and also to admit an ejection finger to eject the seedling from its cell. Obviously such trays may vary in size, shape, and material of construction. Regardless of the variation such trays are handled by the apparatus of this invention.

At the entrance station 19 of FIG. 1 each tray 21 is fed into the apparatus with its long dimension horizontal and the tray standing on edge with the bottom of the tray facing the viewer of FIG. 1. Channel supports are formed by vertical posts 106 which receive tray 21 and next tray in line 22 (shown is dashed lines). Chains 23 move upwardly on the outside of posts 106 and downwardly on the inside of posts 106 with spaced ledges 24 that trays 21, 22 rest on. Chains 23 move incrementally according to steps initiated by ratchet system 29, such that trays 21, 22 move downwardly one horizontal row of cells at a time. Empty trays fall to the ground automatically while the next full tray 22 automatically is caught by chains 23.

The apparatus includes a plurality of moving compartments 14, each formed by two adjacent L-shaped strips 13 suspended in cantilever-fashion from an endless chain 76 driven by sprockets 77. Strips 13 are generally L-shaped and are suspended, where used, over a flat table top surface 11, preferably made of a low friction material. Thus, the compartments 14 have two moving parallel walls 13, passing over a fixed nonmoving floor 11. In FIG. 1 the moving strips 13 cover almost the entire horizontal area of frame base 10, and arranged in an elongated oval, not unlike a race track. Floor 11 is needed only for that portion of the track where the seedlings travel from entrance station 19 to exit station 20. Plants drop from compartments 14 where floor 11 ends at exit station 20.

Tray 21 is shown at entrance station 19 positioned vertically with the bottom of tray 21 facing the viewer of the drawings. Across the lower middle portion of tray 21 is a solid, fixed frame 26 into which are placed a plurality of ejector finger cylinders 45, the number of which corresponding exactly to the number of cells 42 or ejection holes 25 in a horizontal row of tray 21. Closely to the right of tray 21 in entrance station 19 is air distribution system 97 having a vertical central shaft 87 on which are mounted a plurality of arms 88 which control valves to admit sequentially compressed air to cylinders 45 causing a finger 44 to extend to position 43 into an ejection hole 25 to push a seedling out of its cell and into a moving compartment 14 for transportation to exit station 20. Valves on air distribution system 97 are connected respectively to cylinders 45 by a length of rubber hose 28 (only a few shown in dashed lines so as not to obscure other portions of FIG. 1).

Chain 34 and sprockets 33 transmit power from synchronizing sprocket 67 to chains 23 that move tray 21 downward one row of cells 42 in accordance with movements of ratchet system 29 (discussed below).

Figure 2:
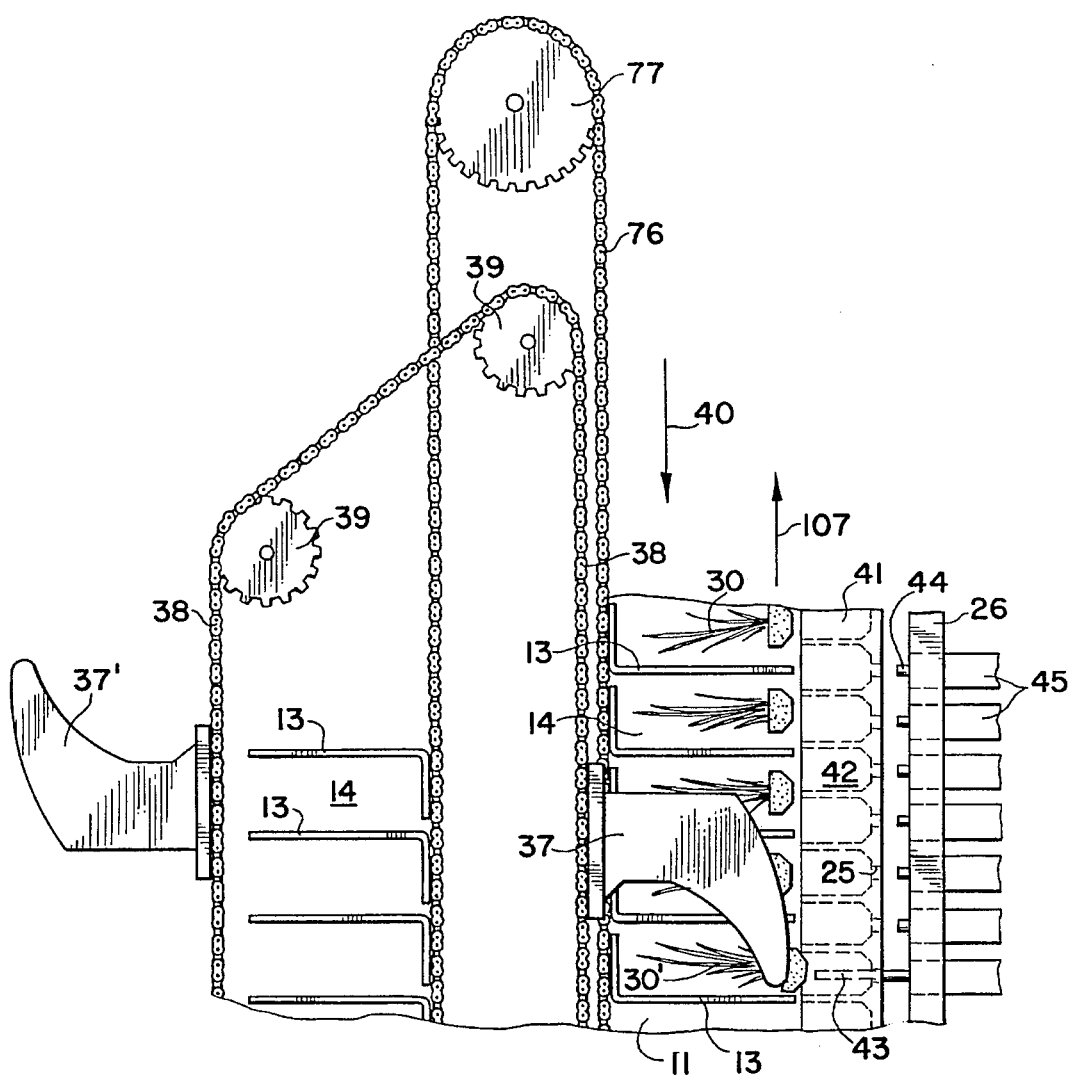
FIG. 2 is a top plan view of a portion of the apparatus showing a foliage separator in action.
Figure 3:
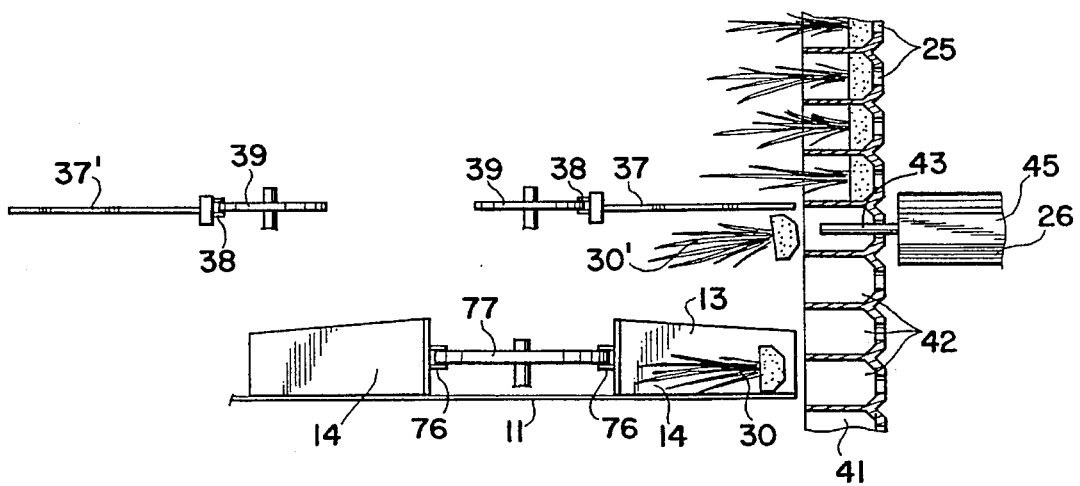
FIG. 3 is an end elevational view of the apparatus of FIG. 2.

In FIGS. 2–3 there are shown two views of a special component that assists in the ejection of one seedling at a time from a tray 21 in the entrance station 19 (see FIG. 1). Tray 41 (enlargement of tray 21) is being emptied of seedlings 30, one at a time. Cells 42 have been emptied and seedlings in alignment therewith are lying in compartments 14 and being moved across table 11 in the direction of arrow 107. Cylinders 45 mounted in support frame 26 are aligned with holes 25 in cells 42. Ejection finger 43 is extended to remove the bottom seedling 30' from its cell. Two separator wings 37 and 37' are mounted on chain 38 operating at a higher elevation than chain 76. Sprockets 39 drive chain 38 in the direction of arrow 40. Separator 37 moves between adjacent horizontal rows of seedlings, specifically between the seedling being ejected and the seedling immediately above the ejected seedling. The purpose is to separate the foliage of these two seedlings so that the ejected seedling will carry with it its own vegetation and not that of the seedling above whose vegetation will tend to droop and get mixed with that of the lower seedling. The movement of separator 37 is timed to match the sequence of ejections by fingers 43. For the sizes of trays and speed adjustments of the embodiments shown here a second separator wing 37' will be ready to start at the beginning of ejection of one row of cells 42 when separator wing 37 exits the end of the previous row of cells 42.

Figure 4:
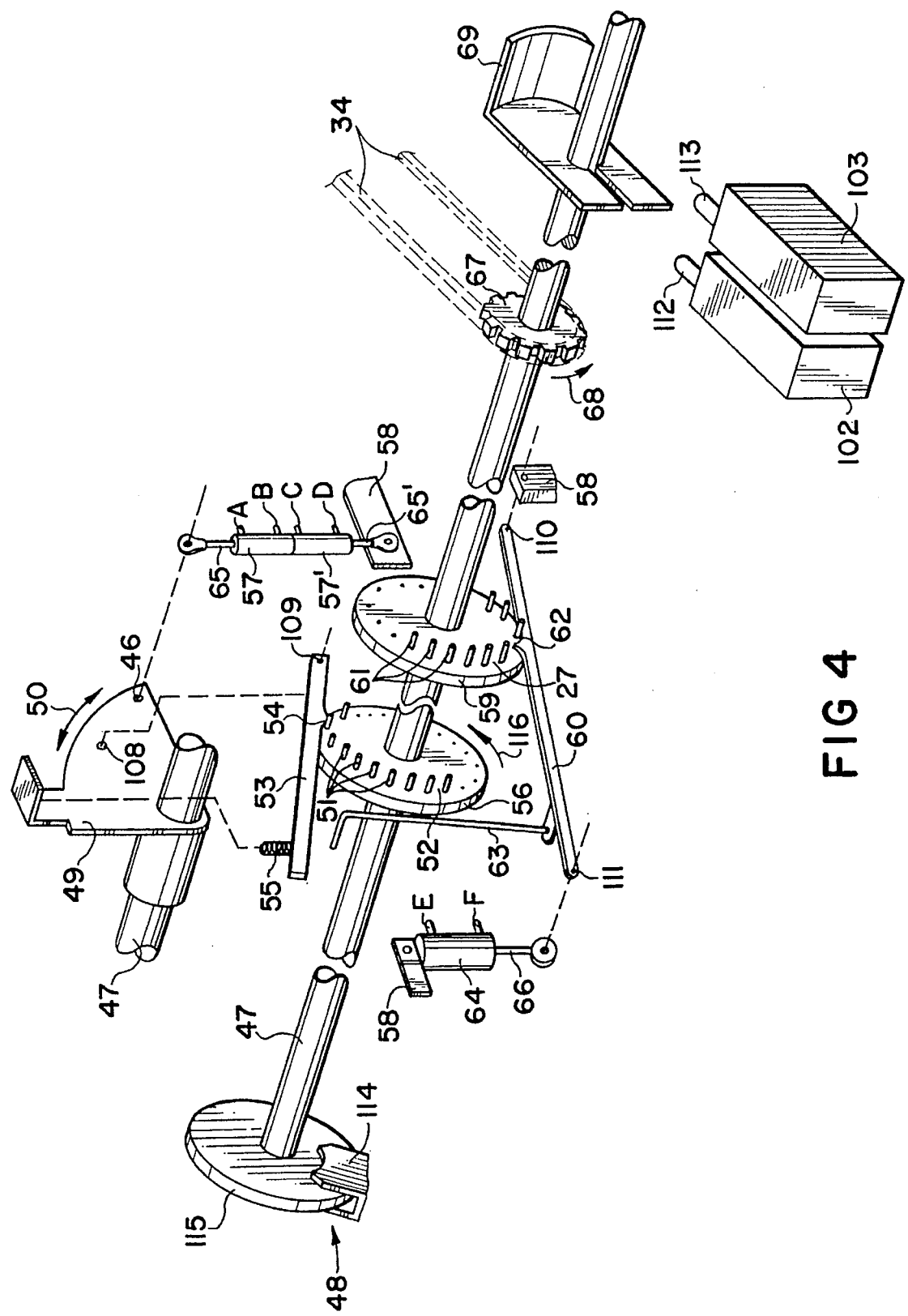
FIG. 4 is an exploded perspective view of the ratchet system for moving a tray of seedlings row-by-row past a plurality of extension fingers employed to eject seedlings from individual cells of a growth tray.

FIG. 4 shows schematically the members of the ratchet system 29 for moving each tray one row downward as it is in the entrance station 19 and having its seedlings sequentially ejected one at a time into the moving compartments 14, as explained above with respect to FIG. 1. Ratchet system 29 includes a common shaft 47 upon which are mounted ratchet lever 49, ratchet wheel 56, detent wheel 59, synchronizer drive sprocket 67, cam 69, and disc brake 48. Ratchet wheel 56 and detent wheel 59 each have pins 51 and 61, respectively, projecting from the face of the wheel to cooperate with pivoted levers, i.e., ratchet pawl 53 and detent lever 60, with notches 54 and 62 respectively, to form a catch for pins 51 and 61, respectively. Ratchet lever 49 is freely rotatable about shaft 47 while all other members 48, 56, 59, 67 and 69 are fixed to shaft 47 and rotate only as shaft 47 rotates. The number of pins 51 in wheel 56 and pins 61 in wheel 59 are the same as the number of horizontal rows of cells in trays 21 (in FIG. 1) or 41 (in FIGS. 2 and 3). Ratchet wheel 56 moves from one pin 51 to the next adjacent pin 51 to cause tray 21 or 41 to move downward one row of cells. The movement of ratchet wheel 56 causes the same movement in sprocket 67 in the direction of arrow 68 which is transmitted via chain 34 to chains 23 upon which tray 21 rests(see FIG. 1).

The operation of ratchet system 29 proceeds as follows. Cams at the top of air distributor 97 (FIG. 1) open air valves that lead to port E of cylinder 64 and port B of cylinder 57. The former extends piston rod 66 to unlock notch 62 from the pin 61 caught thereby and thus unlocks the system to make it ready to move tray 21 one row downward. The admittance of air to port B extends piston rod 65 which pivots ratchet lever 49 about shaft 47 in the direction of upward arrow 50, and by reason of the connection of pivot pin 108 to pivot pin 109 the ratchet lever 53 moves ratchet wheel 56 forward in the direction of arrow 116. Notch 54 latches on corresponding pin 51 to cause wheel 56 to turn. At the end of the movement of ratchet lever 49 air is directed to port F causing the piston rod 66 to retract, raising release arm 63 to tilt the free end of lever 53 upward releasing notch 54 from its pin 51, and at the same time causing detent lever 60 to pivot upward and cause notch 62 to catch the next pin 61 to lock the shaft 47 until the next tray movement. Air is then directed to port A causing rod 65 to retract and ratchet lever 49 to reverse its movement to the downward direction of arrow 50 and allowing notch 54 to catch the next pin 51. At the juncture of two trays in entrance station 19 there is a need to move downward more than merely the distance between adjacent rows of cells. To accomplish that movement there is a large space 52 between adjacent pins 51 and a corresponding large space 27 between pins 61 on the detent wheel 59. This large space 52; 27 on both of wheels 56 and 59 permits the necessary movement of trays to reach alignment with extension finger cylinders 45 (FIG. 1). To accomplish this larger movement air cylinder 57' is employed along with air cylinder 57 to provide a larger movement to ratchet lever 49. The combination of cylinders 57 and 57' is controlled by the action of cam 69 on buttons 112 and 113 of air valves 102 and 103. The need for this extra travel occurs only once per tray; thus one revolution of shaft 47 occurs while one tray is in entrance station 19. Disc brake 48 provides an adjustable dampening action to provide a drag to the rotation of shaft 47 so that it does not overrotate in any of its movements. Clamps 114 are adjustable against disc 115.

Figure 5:
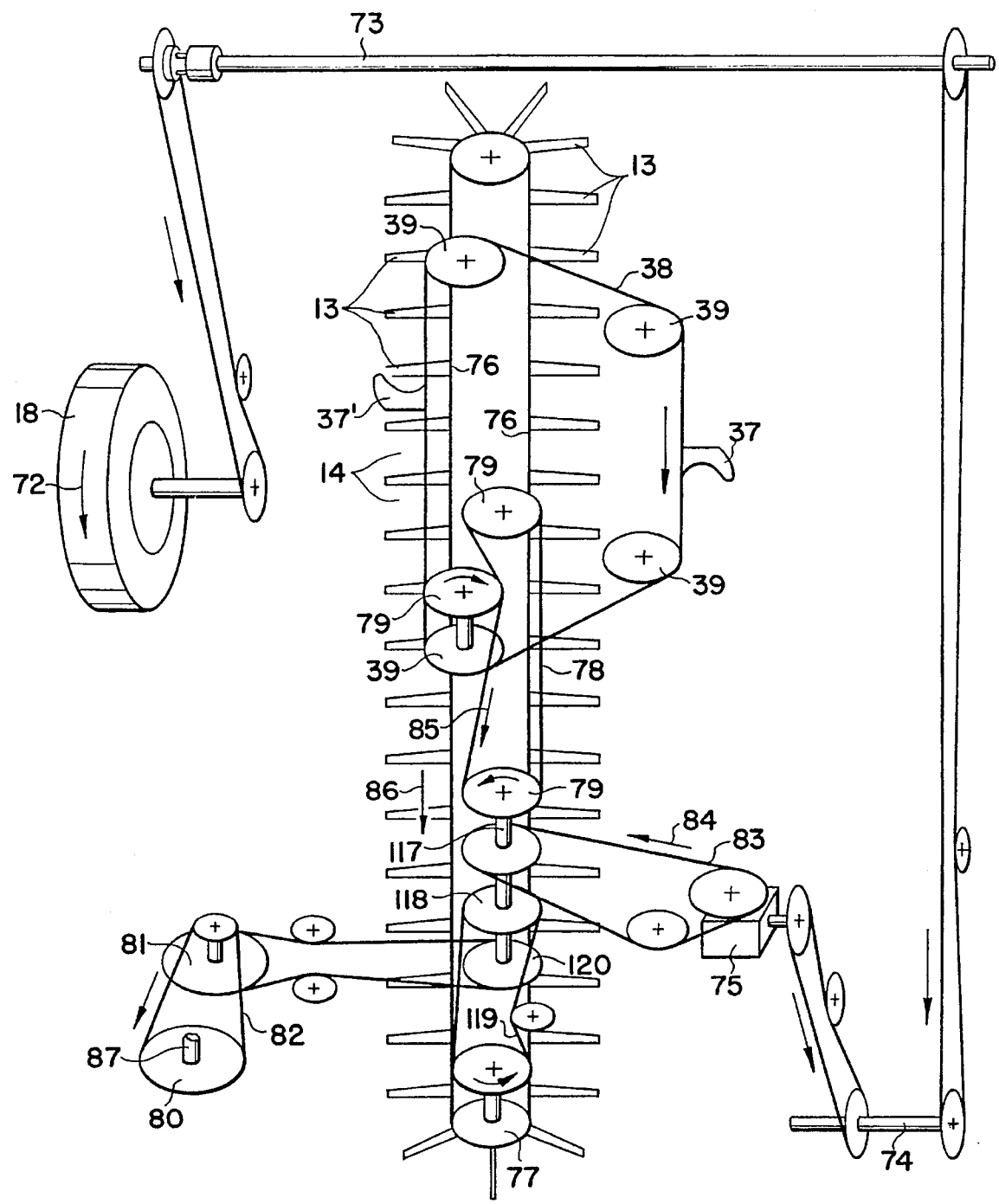
FIG. 5 is a schematic view in perspective of the chain drive system for transferring power from a rotating ground-engaging wheel to each component of the apparatus.

FIG. 5 is a schematic skeleton view in perspective of the chain drive system which powers the apparatus of this invention. It should be noted that this invention can operate by use of one or more electric or internal combustion engines combined with suitable timing devices. However, the practical and preferred system is that shown in FIG. 5, since the realistic use of this apparatus is on a towed vehicle working on a farm. The system about to be described generates all of the necessary power from a ground engaging wheel.

In FIG. 5 there is a wheel 18 turning in the direction of arrow 72 as it is towed behind a tractor moving across an open field. The rotational power of wheel 18 is transmitted to shaft 73 by way of sprockets and chain (unnumbered) and from shaft 73 to shaft 74 by other sprockets and chain (also unnumbered). The torque of shaft 74 is transmitted through a right angle gear box 75 to chain 83 moving in the direction of arrow 84 to a vertical stack 117 of sprockets, from which all other component systems are driven. Top sprocket 79 drives chain 78 which in turn drives chain 38 which carries separator wings 37 and 37'. Sprocket 118 drives chain 119 which transfers power from vertical stack 117 to sprocket 77 which drives chain 76 that carries divider walls 13 that form compartments 14 for the movement of seedlings. Vertical stack 117 includes sprocket 120 which drives sprockets 80 and 81, which in turn drive shaft 87 of the air distribution system (97 of FIG. 1). The timing of the movements of all component systems is adjusted by selecting the appropriate sizes of sprockets.

Figure 6:
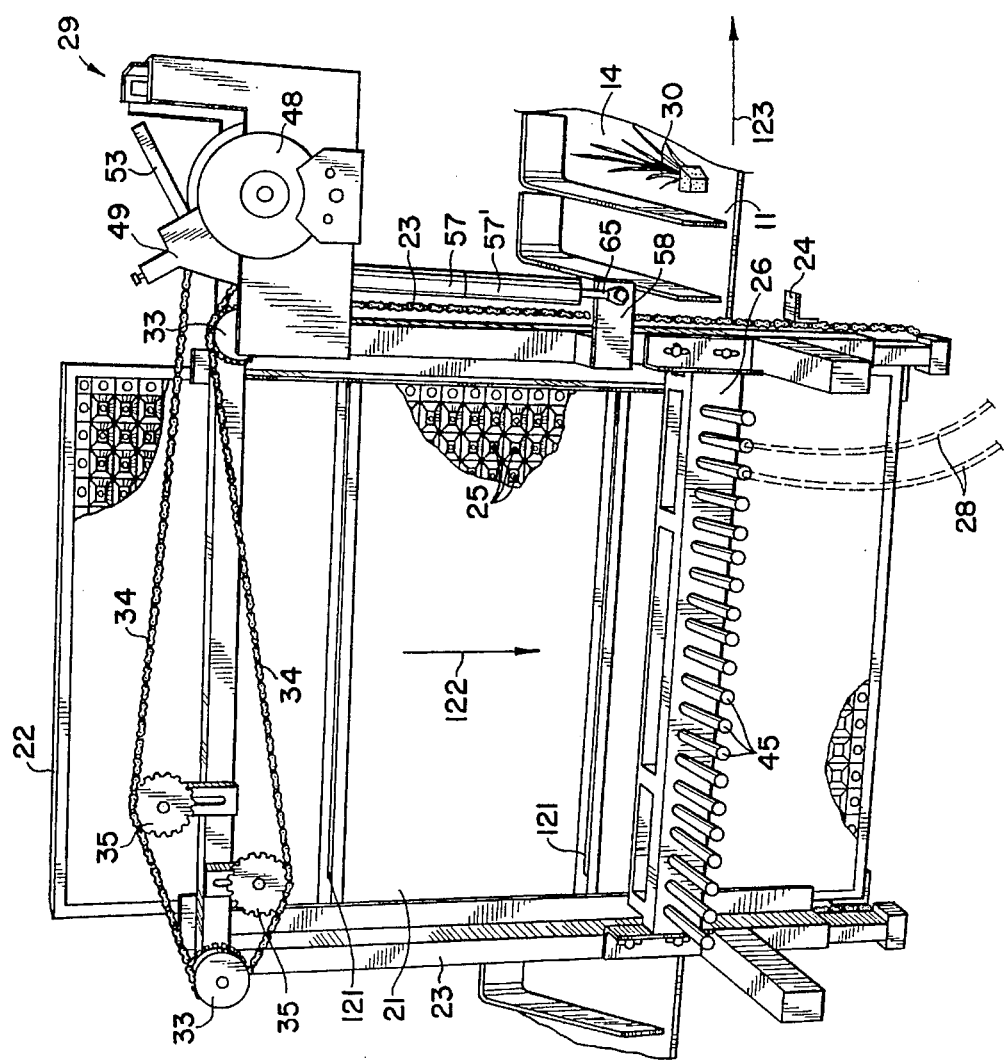
FIG. 6 is a perspective view of the extension fingers as they operate to eject seedlings by pushing the fingers into each cell from the back side of the tray and also a view of the ratchet system of FIG. 4 and its connection to the trays.

FIG. 6 shows an enlarged view of the entrance station 19 where trays 21, 22 of seedlings are fed into the apparatus, seedlings are removed, and empty trays are discharged. The view of trays 21, 22 is of the bottom of the trays where drainage and ejector holes 25 are visible. Junctures 121 are the places where adjoining trays touch each other. Trays 21, 22 move downward in the direction of arrow 122 as tray movement system 19 functions including ratchet lever 49, ratchet pawl 53, and disc brake 48. Compartments 14 move in the direction of arrow 123 to convey seedlings 30 to the exit station 20. Chain 34 is driven by drive sprocket 67. Sprockets 33 transmit power to chains 23 on each side of trays 21, 22 to move trays downward one row of ejector holes 25 at a time, trays resting on ledges 24 carried on chains 23. Adjustment of the vertical positions of idler sprockets 33 causes the frames 21, 22 to be aligned horizontally with frame support 26, thus aligning holes 25 in individual cells to be aligned with extension fingers protruding from cylinders 45. Air actuates one cylinder 45 at a time to extend a finger (not shown) through an ejection hole to push a seedling out of its cell and drop it into a compartment 14 that is moved away to exit station for discharge of the seedling 30 for planting or other purpose. The transplanting machine of my U.S. Pat. No. 4,788,920 is particularly useful for receiving individual seedlings 30 and planting them in rows in the ground.

Figure 7:
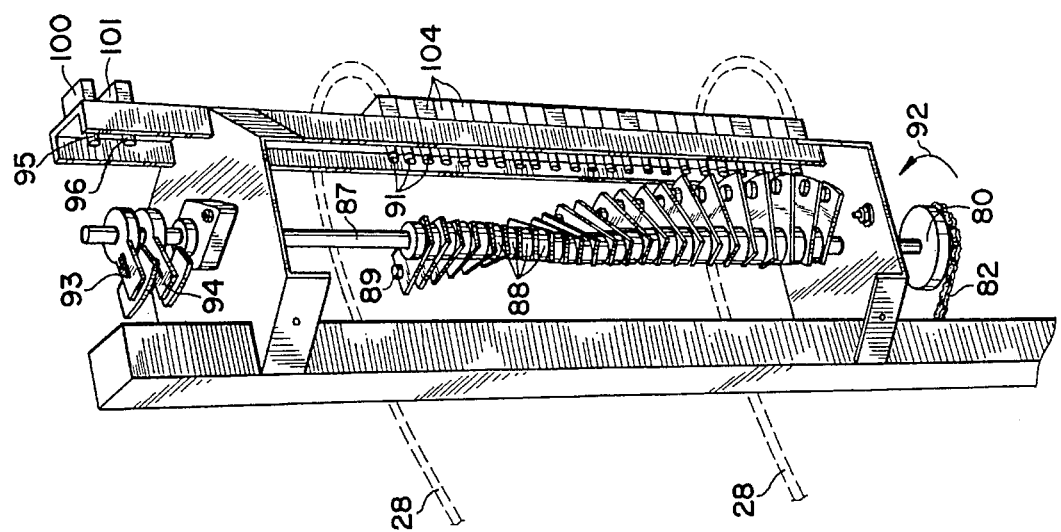
FIG. 7 is a perspective view of the air distribution system for activating the extension fingers at the appropriate time.

FIG. 7 is a perspective view of the air distribution system (97 in FIG. 1) which receives compressed air from a central reservoir and directs it to the entrance station for ejection of seedlings from cells and for operation of the timing and locking portions of the tray movement system 29. In its essence this component system is a plurality of spool-type air valve activated by spring biased metal spheres 91. The valves function as closures in flexible rubber tubes 28 carrying compressed air. When the sphere is pushed inward it opens the valve and allows compressed air to pass. A plurality of arms 88 are mounted on a vertical shaft 87 which turns as sprocket 80 is turned by chain drive 82 (see FIG. 5) in the direction of arrow 92. Each arm 88 has a roller 89 at its end to contact the ball actuators 91 that open and close the valves that are connected to cylinders 45 of the ejection system. When each actuator 91 is opened, its corresponding cylinder 45 is forced to extend its finger into an ejection hole 25 to eject a seedling from its cell. Other air valves 104 are also actuated in air distribution system 97. For example, cams 93 and 94 operate once per revolution of shaft 87 to open spool valves 100 and 101 respectively, which are four-way valves (see FIG. 8) that operate members of the tray movement system (see FIG. 4).

Figure 8:
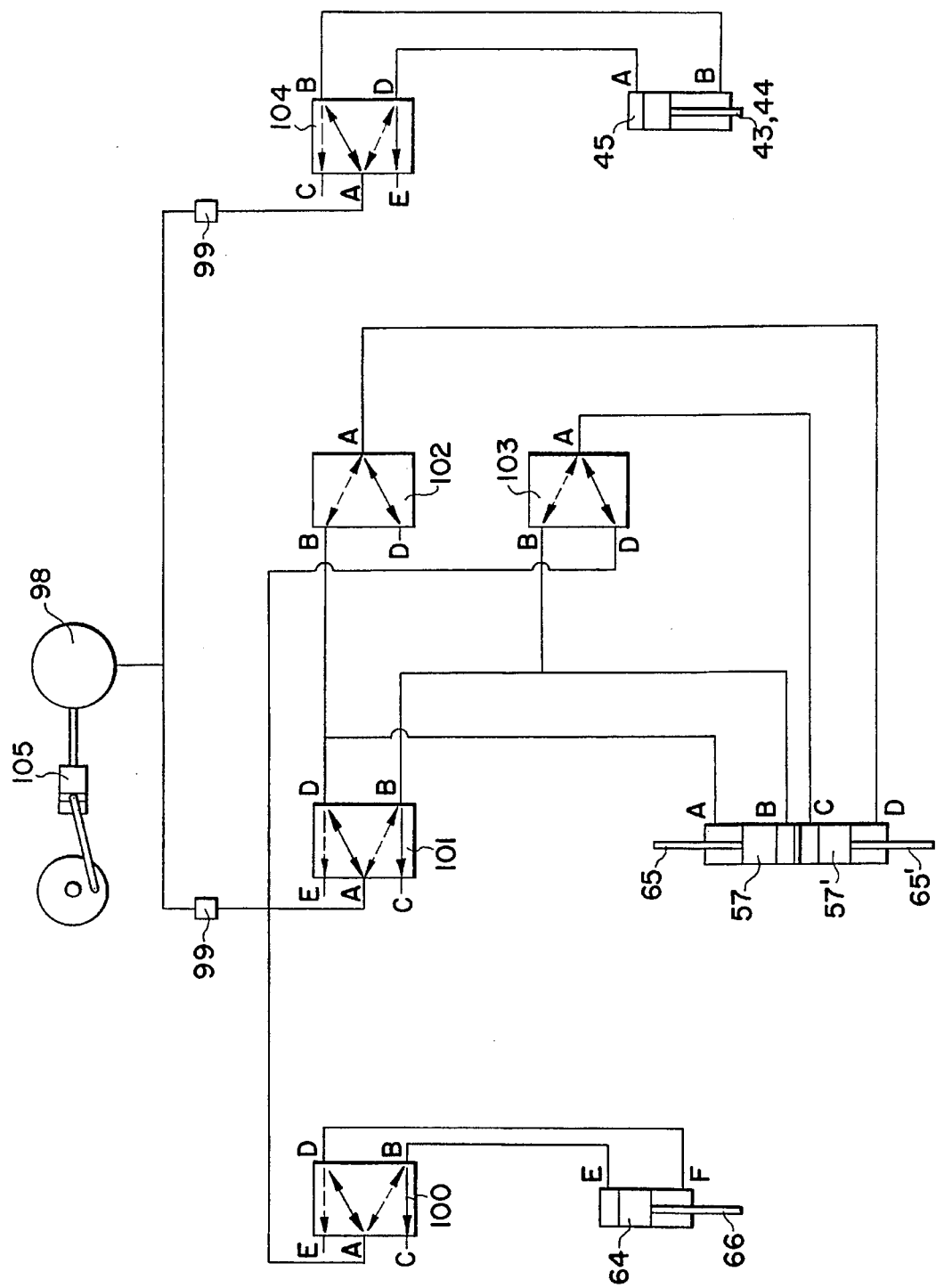
FIG. 8 is a schematic digram of the operation of the compressed air system employed on the extension fingers and the ratchet system for moving trays.

FIG. 8 shows the general operation of valves in the compressed air system. Valve 100 operates detent air cylinder 64 (see FIG. 4). Valve 101 operates upper ratchet air cylinder 57 (see FIG. 4). Valves 102 and 103 operate lower air ratchet cylinder 57'. Valve 104 operates air cylinders 45 that successively eject seedlings from their trays as ejection fingers r3 are extended. The system of FIG. 8 shows an air compressor 105 that would be carried on the tractor towing the apparatus of this invention. The compressed air from compressor 105 is stored in reservoir 98 and flows through lines in the diagram of FIG. 8 through pressure regulators 99 to the various valves 100–104, and from such valves to the cylinders 45, 57, 57' and 64. Ports of the valves are lettered A–E and directional arrows show the operation of the valve. Solid lines show passageways open when the valve is at rest or not activated. Dotted lines show the passageways open when the valve is activated. For example, Valve 100 governs the operation of detent air cylinder 64 (refer to FIG. 4). When detent air cylinder 64 is at rest rod 66 is retracted as shown in FIG. 4, with pawl release arm 63 touching the end of ratchet pawl 53, and notch 62 securely pressed upward around a pin 61 locking everything in place. In this posture valve 100 permits compressed air to pass from Port A to Port D which enters cylinder 64 through Port F retracting rod 66. Any residual air in cylinder 64 would be exhausted through Port E to valve 100 where it would pass from B to C to the outside atmosphere. When it is time to activate cylinder 64 by the action of cam 93 pressing on ball 95 of valve 100 (see FIG. 7). Valve 100 changes its passageways to admit compressed air at A and passing it out of Port B, which allows compressed air to enter cylinder 64 through Port E, which moves the internal piston (unnumbered) and causes rod 66 to extend which moves detent lever 60 (see FIG. 4) downward to unlock notch 62 from pin 61.

The same analysis can be followed through from cam 94 opening ball 96 (FIG. 7) to cause valve 101 (FIG. 8) to allow compressed air to enter Port B of cylinder 57 to extend rod 65 to cause ratchet lever 49 (FIG. 4) to turn ratchet wheel 56 from one pin 51 to the next adjacent pin 51. Similarly, Valves 102 and 103 can be activated when it is time to cause ratchet wheel 56 to turn the extra amount of space 52 when the entrance station 19 must move an extra amount to pass over a juncture 121 between adjacent trays 21, 22.

Valve 104 opens and closes each time a single cylinder 45 extends its finger 43 to eject a seedling from a tray cell. Valves 102 and 103 are each operated individually by an arm (FIG. 4) with a cam surface 69 to bear against ball actuators 112 and 113, the arms being set at the appropriate location on shaft 47. Valve 104 represents each valve that is connected to an air cylinder 45; thus there are as many valves 104 as there are cylinders 45.

Figure 9:
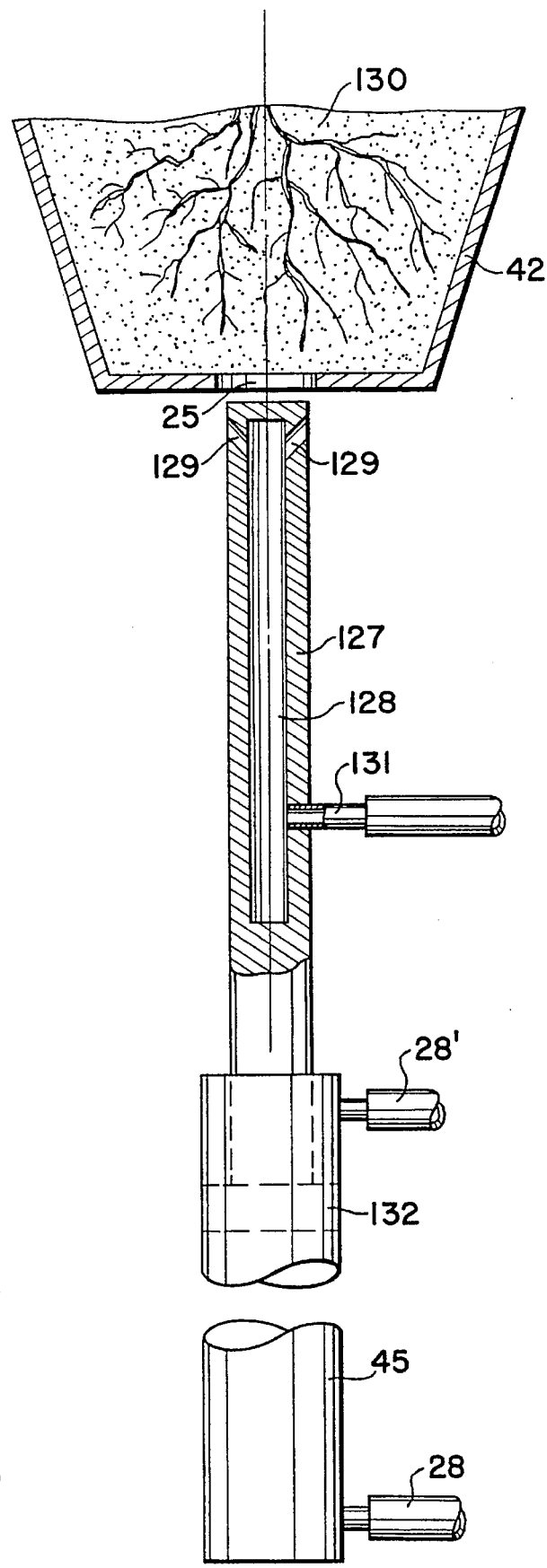
FIG. 9 is an enlarged schematic illustration, partly in cross section, of a second embodiment of an ejection finger used in this invention.

FIG. 9 illustrates a second embodiment of an ejection finger (see 43 and 44 of FIGS. 2 and 3). In this embodiment cylinder 45 is the same as that shown in FIGS. 1, 2, 3, and 6 having two inlets 28 and 28' for compressed air to withdraw and to extend finger 127, respectively, as pressure is applied to opposite sides of piston 132. The object of extending finger 127 is to push the root ball 130 of the seedling from cell 42 by extending finger 127 through hole 25 to contact root ball 130. This embodiment of the finger 127 has a hollow 128 along the lengthwise axis of finger 127 with outlets 129 directing the compressed air into two or more directions on the bottom of root ball 130. Inlet 131 feeds compressed air into hollow 128 as activated by a valve (not shown) familiar to those 91 shown in FIG. 7. After finger 127 has extended through hole 25, air is introduced through inlet 131 as finger 127 continues to extend to its maximum length. It has been found that this embodiment substantially reduces the seedlings destroyed when the root ball 130 crumbled during ejection with fingers not having the capability of compressed air exiting through ports such as 129.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An apparatus for receiving at an entrance station successive trays of nursery seedlings growing in individual cells each having an ejector hole in the bottom thereof, the cells being arranged in rows in a checkerboard pattern; ejecting the seedlings from their cells individually into moving compartments, and transporting them to an exit station for discharge one at a time; said apparatus comprising an entrance station including a vertical chute for holding said trays positioned on edge vertically with the stalks of said seedlings generally horizontal, and including means for moving each tray vertically downward at selected times to position each successive horizontal row of said cells at a selected elongation for ejection of seedlings therefrom; said apparatus including a plurality of ejection fingers arranged in a horizontal row and adapted to be extended one at a time to protrude into said ejection hole of each cell successively in a row of said tray to eject the seedling from said cell and subsequently to be withdrawn from said cell; said apparatus including a succession of moving compartments each of a size to receive a single seedling as it is ejected from said tray and to retain that seedling lying on its side as it is transported horizontally to said exit station to be discharged therefrom; said apparatus including pneumatic means to power said ejection fingers in their movement of extension and withdrawal and to time the movement of the tray past the ejection fingers; and power means to operate all other moving components of said apparatus.

2. The apparatus of claim 1 wherein said apparatus is mounted on a horizontal base supported on a ground-engaging wheel as said base is towed behind a vehicle, said power means including said wheel providing power transmitted by chain means to all moving components of said apparatus except for said ejection fingers powered by said pneumatic means.

3. The apparatus of claim 1 wherein said exit station is adapted to discharge successive seedlings into an entrance of a machine for receiving individual seedlings and planting them at spaced intervals in the ground over which said apparatus is being towed.

4. The apparatus of claim 1 wherein said moving compartments comprise an endless moving belt having a plurality of spaced divider strips affixed perpendicularly thereto and adapted to be suspended closely above a fixed horizontal surface.

5. The apparatus of claim 1 which additionally includes a horizontally moving thin sheet-like separator wing adapted to separate the foliage of a seedling being ejected from a cell from the foliage of a seedling in the cell vertically above the cell being vacated.

6. The apparatus of claim 1 wherein said ejection fingers are positioned in a fixed horizontal row spaced closely adjacent to the bottom surface of said tray and aligned with said ejection holes in said tray.

7. The apparatus of claim 6 wherein said means for moving each tray includes a ratchet-and-detent mechanism for moving each said tray vertically downward successively the distance between two adjacent rows of said cells.

8. The apparatus of claim 1 wherein said pneumatic means includes a supply of compressed air, a distribution network of tubing connecting said supply to components being operable by periodic shots of compressed air, a valve in each distribution tube and a rotating arm for each valve adapted to press against its valve as it rotates, and thereby temporarily open that valve to allow a shot of compressed air to be applied to the component on that distribution network.

9. The apparatus of claim 8 wherein a ratchet drive and a detent lever lock are operated by said periodic shots of compressed air to control the movement of said tray past said ejection fingers.

10. An apparatus adapted to be towed behind a vehicle and used for the purpose of removing seedlings individually from a tray of such seedlings and planting them at spaced locations in the ground; said apparatus including a horizontal base mounted on ground-engaging wheels, an entrance station adapted to receive a plurality of trays of seedlings positioned vertically on edge with seedling stalks generally horizontal, each seedling in a cell having an ejector hole in the bottom thereof, the cells arranged in a plurality of contiguous horizontal rows and aligned in vertical rows; a first endless moving belt with a plurality of spaced, cantilevered separator strips extending outwardly from said belt and spaced closely above a fixed horizontal surface to form a series of moving compartments; a spaced endless moving belt containing a thin planar blade separator projecting horizontally outward therefrom spaced above said fixed horizontal surface, and parallel thereto, and adapted to separate the foliage of a seedling while it is being ejected from its cell from the foliage of the seedling in the cell immediately above said cell being vacated; a fixed horizontal row of ejection fingers spaced closely to and aligned with said ejection holes in a horizontal row of said cells in said tray, the ejection fingers pneumatically powered to be successively extended and withdrawn to cause each said seedling to be ejected from its cell and fall into one of said moving compartments; an exit station along the path of said moving compartments where each said seedling is successively fed into a planting mechanism and planted in the ground at a selected distance from the next previously planted seedling; a pneumatic system for causing said ejection fingers to successively extend into an ejection hole and eject a seedling from a cell into one of said moving compartments and to withdraw from said cell until an entire row of said cells have been emptied of their seedlings, and then rotate a ratchet wheel in a ratchet system for controlling the movement downward of said trays row-by-row one step, to cause said tray to move vertically downward one cell row to be in alignment with said row of ejection fingers, lock the tray in that position by movement of a detent in said ratchet system, and repeat the above steps in ejecting seedlings; a power transmission system of chains to transmit said power from said ground-engaging wheel to all the moving components of said apparatus other than those powered pneumatically.

11. The apparatus of claim 10 wherein each of said ejection fingers is a piston in a pneumatic cylinder connected via a valved tubing to a source of compressed air, the valve in said tubing being opened periodically by physical contact between a rotating arm operatively connected to said power transmission system and a spring biased plunger connected to said valve.

12. The apparatus of claim 11 wherein a simple rotating timing shaft has mounted thereon one said rotating arm per each said ejection finger, and also a rotating arm to contact an air valve for each of said ratchet wheel and said detent; said timing shaft rotating once per row of cells in said tray.

13. The apparatus of claim 10 wherein said detent includes a wheel which is mounted on a common shaft with said ratchet wheel, a disc brake, and a cam for initiating a special movement when said ejection fingers must remain immobile in an unextended position while an empty tray is ejected from said apparatus and replaced by the next tray of seedlings.

14. The apparatus of claim 10 wherein said ejection fingers additionally include a means to supply compressed air directed against the bottom of said seedling in said cell to assist in removal of the seedling therefrom.

15. The apparatus of claim 14 wherein said means comprises a central hollow in each said ejection finger with diversely directed exit pathways at the end of said finger adjacent said seedling and a source of compressed air at an entrance to said hollow distant from said exit pathways.

* * * * *